United States Patent
Zhong et al.

(10) Patent No.: US 12,074,689 B2
(45) Date of Patent: Aug. 27, 2024

(54) APPARATUS AND CASCADING SYSTEM FOR GENERATING DUMMY OPTICAL SIGNAL

(71) Applicant: HUAWEI TECHNOLOGIES CO., LTD., Shenzhen (CN)

(72) Inventors: Shengqian Zhong, Dongguan (CN); Jian Chen, Wuhan (CN); Youxi Lin, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 17/941,401

(22) Filed: Sep. 9, 2022

(65) Prior Publication Data
US 2023/0006756 A1 Jan. 5, 2023

Related U.S. Application Data

(63) Continuation of application No. PCT/CN2021/072128, filed on Jan. 15, 2021.

(30) Foreign Application Priority Data

Mar. 12, 2020 (CN) .......................... 202010170688.3

(51) Int. Cl.
H04J 14/02 (2006.01)
(52) U.S. Cl.
CPC ...... *H04J 14/0212* (2013.01); *H04J 14/0221* (2013.01)
(58) Field of Classification Search
CPC ........................ H04J 14/0212; H04J 14/0221
See application file for complete search history.

(56) References Cited

U.S. PATENT DOCUMENTS

| | | | |
|---|---|---|---|
| 6,487,329 B2 | 11/2002 | Foltzer | |
| 6,522,803 B1 * | 2/2003 | Nakajima | H04Q 11/0005 385/24 |
| 6,771,905 B1 | 8/2004 | Bortz | |
| 9,219,565 B2 | 12/2015 | Kaneko et al. | |
| 9,841,571 B1 * | 12/2017 | Momtahan | G02B 6/4207 |
| 2003/0044111 A1 * | 3/2003 | Oberland | H04B 10/506 385/24 |

(Continued)

FOREIGN PATENT DOCUMENTS

| | | | |
|---|---|---|---|
| CN | 101900575 A | | 12/2010 |
| CN | 102593697 A | * | 7/2012 |

(Continued)

OTHER PUBLICATIONS

Extended European Search Report issued in corresponding European Application No. 21767346.6, dated Jul. 11, 2023, pp. 1-9.

(Continued)

*Primary Examiner* — Pranesh K Barua
(74) *Attorney, Agent, or Firm* — HAUPTMAN HAM, LLP

(57) ABSTRACT

A dummy optical signal generation apparatus includes a multi-longitudinal mode laser configured to provide a light source signal. The dummy optical signal generation also includes a comb optical bandpass filter. The light source signal provided by the multi-longitudinal mode laser outputs a dummy optical signal through the comb optical bandpass filter. The dummy optical signal is an optical signal that does not comprise service information.

20 Claims, 8 Drawing Sheets

(56) References Cited

U.S. PATENT DOCUMENTS

| 2013/0324819 | A1  | 12/2013 | Colvin, Jr. |
| 2015/0043920 | A1  | 2/2015  | Ji et al. |
| 2015/0171987 | A1* | 6/2015  | Boertjes ........... H04B 10/07955 |
|              |     |         | 398/83 |

FOREIGN PATENT DOCUMENTS

| CN | 102593697   | A  | 7/2012  |
| CN | 103311802   | A  | 9/2013  |
| CN | 107408985   | A  | 11/2017 |
| CN | 110401098   | A  | 11/2019 |
| WO | 2014107537  | A1 | 7/2014  |

OTHER PUBLICATIONS

International Search Report issued in corresponding International Application No. PCT/CN2021/072128, dated Apr. 16, 2021, pp. 1-8.

Chinese Office Action issued in corresponding Chinese Application No. 202010170688.3, dated Jun. 2, 2022, pp. 1-8.

\* cited by examiner

APPARATUS AND CASCADING SYSTEM FOR GENERATING DUMMY OPTICAL SIGNAL

CROSS-REFERENCE TO RELATED APPLICATIONS

This application is a continuation of International Application No. PCT/CN2021/072128, filed on Jan. 15, 2021, which claims priority to Chinese Patent Application No. 202010170688.3, filed on Mar. 12, 2020. The disclosures of the aforementioned applications are hereby incorporated by reference in their entireties.

TECHNICAL FIELD

This application relates to the light communications field, and in particular, to an apparatus and a cascading system for generating a dummy optical signal.

BACKGROUND

With the development of communications technologies, dozens of or even hundreds of optical channels exist in one optical fiber based on a wavelength division multiplexing (WDM) technology. In addition, with the use of an optical fiber amplifier, high-power multi-wavelength optical signals are coupled into one optical fiber, so that the multi-wavelength optical signals are gathered on a very small interface. In this case, the optical fiber starts to show a nonlinear feature, and becomes a key factor limiting transmission performance.

In a WDM system, due to a stimulated Raman scattering (SRS) effect, energy transfer may occur between different wavelengths, causing a decrease in an optical power. To avoid this case, a dummy light technology is provided. However, a dummy light technology requires that all wavelengths are enabled at an initial stage. It indicates that a large quantity of optical transponder units (OTU) are configured at the initial stage. Consequently, high costs are caused.

SUMMARY

Embodiments of this application provide an apparatus for generating a dummy optical signal, to reduce costs of generating a dummy optical signal.

According to a first aspect, an embodiment of this application provides an apparatus for generating a dummy optical signal. A structure of the apparatus includes a multi-longitudinal mode laser and a comb optical bandpass filter. The multi-longitudinal mode laser is connected to the comb optical bandpass filter. The multi-longitudinal mode laser is configured to: provide a light source signal, and output the light source signal to the comb optical bandpass filter. The comb optical bandpass filter filters the light source signal, and outputs a dummy optical signal. The dummy optical signal is an optical signal that does not include service information.

In this embodiment, the apparatus for generating a dummy optical signal may also be referred to as a dummy light apparatus. To implement channel equalization, the dummy light apparatus generates a dummy optical signal consistent with a service signal. The multi-longitudinal mode laser may be a Fabry Perot (FP) laser, or may be another laser.

In the technical solution provided in this embodiment of this application, the multi-longitudinal mode laser and the comb optical bandpass filter have relatively low costs, so that costs of generating the dummy optical signal are reduced.

Optionally, the dummy optical signal includes multi-wavelength signals with preset wavelength spacing. It may be understood that the dummy optical signal may include equally spaced multi-wavelength signals.

Optionally, the comb optical bandpass filter may be an etalon or a gain flattening filter. The etalon may be selected according to an actual requirement. For example, a 50 GHz/100 GHz spaced etalon is used, or an etalon with 25 GHz spacing or other spacing is used.

Optionally, to implement flatness of the dummy optical signal, the apparatus further includes a circulator. The multi-longitudinal mode laser, the circulator, and the comb optical bandpass filter are connected in sequence. An optical path in the apparatus is as follows: The light source signal provided by the multi-longitudinal mode laser is input through a first port of the circulator, and then is output to the comb optical bandpass filter through a second port of the circulator. The light source signal provided by the multi-longitudinal mode laser is output to a third port of the circulator through a first output port of the comb optical bandpass filter, and is further output to the comb optical bandpass filter through the second port of the circulator. When the dummy optical signal output by the comb optical bandpass filter meets a first preset condition, the dummy optical signal is output through a second output port of the comb optical bandpass filter. In other words, the light source signal provided by the multi-longitudinal mode laser is input through the first port of the circulator and is output from the second port, returns to the third port of the circulator through the comb optical bandpass filter, and is output from the first port to enter the multi-longitudinal mode laser, to form a resonant cavity. Longitudinal mode positions of the multi-longitudinal mode laser are controlled by using a thermoelectric cooler (TEC), to implement gain equalization between longitudinal modes, thereby effectively improving flatness between longitudinal modes in output.

Optionally, the apparatus may further include a coupler. A structure is that the multi-longitudinal mode laser, the circulator, the comb optical bandpass filter, and the coupler are connected in sequence. A light source signal provided by the multi-longitudinal mode laser is input through the first port of the circulator, and then is output to the comb optical bandpass filter through the second port of the circulator. The light source signal provided by the multi-longitudinal mode laser is output to the coupler through the comb optical bandpass filter, is output to the third port of the circulator through a first output port of the coupler, is further output to the comb optical bandpass filter through the second port of the circulator, and then is output to the coupler through the comb optical bandpass filter. When a dummy optical signal output by the coupler meets a second preset condition, the dummy optical signal is output through a second output port of the coupler. In other words, the light source signal provided by the multi-longitudinal mode laser is input through the first port of the circulator and is output from the second port, returns to the third port of the circulator through the comb optical bandpass filter and the coupler, and is output from the first port to enter the multi-longitudinal mode laser, to form a resonant cavity. Longitudinal mode positions of the multi-longitudinal mode laser are controlled by using a TEC, to implement gain equalization between longitudinal modes, thereby effectively improving flatness between longitudinal modes in output. In the foregoing two apparatuses, the first preset condition may be the same as or different from the second preset condition, provided that the dummy optical signal is amplified to meet an output condition.

Optionally, the apparatus may further include a bandpass filter. The bandpass filter is configured to: receive the dummy optical signal, and obtain a dummy optical signal on a specific band from the dummy optical signal. A peak power of the dummy optical signal on the specific band is greater than or equal to a preset threshold. Alternatively, flatness of the dummy optical signal on the specific band is less than or equal to a preset threshold. To implement this function, the bandpass filter may be located behind the comb optical bandpass filter. Alternatively, the bandpass filter may be located behind the coupler.

Optionally, the apparatus for generating dummy optical signal generates a fixed relative intensity noise (RIN) in an actual application process. To reduce the RIN, a structure of the multi-longitudinal mode laser may be optimized. When other conditions remain unchanged, a reflectivity of an out-light end face of the multi-longitudinal mode laser may be improved to effectively reduce the RIN. It may be understood that the out-light end face of the multi-longitudinal mode laser is an emergent end face of the multi-longitudinal mode laser, and the reflectivity of the out-light end face affects an output feature of the laser.

According to a second aspect, an embodiment of this application provides a cascading system for generating a dummy optical signal. The cascading system includes a plurality of apparatuses for generating dummy optical signals and at least one multiplexing apparatus. The apparatus for generating a dummy optical signal includes a multi-longitudinal mode laser and a comb optical bandpass filter. The multi-longitudinal mode laser is connected to the comb optical bandpass filter. The multi-longitudinal mode laser is configured to provide a light source signal. A light source signal provided by the multi-longitudinal mode laser outputs a dummy optical signal through the comb optical bandpass filter. The dummy optical signal is an optical signal that does not include service information. The at least one multiplexing apparatus multiplexes dummy optical signals generated by the plurality of apparatuses for generating dummy optical signals.

In the technical solution provided in this embodiment, the cascading system multiplexes the dummy optical signals generated by the plurality of independent dummy light apparatuses, to form different wavelength ranges. In addition, units in a dummy light structure are independent of each other, to implement relatively high reliability, good scalability, and high integrity. The plurality of dummy light apparatuses with different wavelength spacing are superposed. A quantity of longitudinal modes in each optical signal channel is increased. A channel power remains unchanged. This is equivalent to reduction of power spectrum density. In this way, a RIN in each optical signal channel can be effectively reduced, thereby effectively reducing nonlinear costs of signal transmission on each channel.

Optionally, the apparatus for generating a dummy optical signal may further include a bandpass filter. The bandpass filter is configured to: receive the dummy optical signal, and obtain a dummy optical signal on a specific band from the dummy optical signal. A peak power corresponding to the dummy optical signal on the specific band is greater than or equal to a preset threshold. Alternatively, flatness of the dummy optical signal on the specific band is less than or equal to a preset threshold. To implement this function, the bandpass filter may be located behind the comb optical bandpass filter. Alternatively, the bandpass filter may be located behind a coupler.

Based on the foregoing solution, that the cascading system multiplexes the dummy optical signals generated by the plurality of apparatuses for generating dummy optical signals may be as follows:

In a possible implementation, the plurality of apparatuses for generating dummy optical signals perform only one level of multiplexing. The cascading system includes a first apparatus for generating a dummy optical signal and a second apparatus for generating a dummy optical signal. The first apparatus for generating a dummy optical signal includes a first bandpass filter. The second apparatus for generating a dummy optical signal includes a second bandpass filter. An that the cascading system multiplexes the dummy optical signals is as follows: The first bandpass filter obtains a first specific dummy optical signal in the first dummy optical signal output by the first apparatus for generating a dummy optical signal. The second bandpass filter obtains a second specific dummy optical signal in the second dummy optical signal output by the second apparatus for generating a dummy optical signal. The multiplexing apparatus multiplexes a first band and a second band by using a wavelength division multiplexing device.

In another possible implementation, the plurality of apparatuses for generating dummy optical signals perform a plurality of levels of multiplexing. The cascading system includes a first apparatus for generating a dummy optical signal, a second apparatus for generating a dummy optical signal, a third apparatus for generating a dummy optical signal, a fourth apparatus for generating a dummy optical signal, a first multiplexing apparatus, a second multiplexing apparatus, and a third multiplexing apparatus. The first apparatus for generating a dummy optical signal includes a first bandpass filter. The second apparatus for generating a dummy optical signal includes a second bandpass filter. The third apparatus for generating a dummy optical signal includes a third bandpass filter. The fourth apparatus for generating a dummy optical signal includes a fourth bandpass filter. An operation that the cascading system multiplexes the dummy optical signals is as follows: The first bandpass filter obtains a first specific dummy optical signal in a first dummy optical signal output by the first apparatus for generating a dummy optical signal. The second bandpass filter obtains a second specific dummy optical signal in a second dummy optical signal output by the second apparatus for generating a dummy optical signal. The first multiplexing apparatus multiplexes the first specific dummy optical signal and the second specific dummy optical signal to obtain a first multiplexing wave. The third bandpass filter obtains a third specific dummy optical signal in a third dummy optical signal output by the third apparatus for generating a dummy optical signal. The fourth bandpass filter obtains a fourth specific dummy optical signal in a fourth dummy optical signal output by the fourth apparatus for generating a dummy optical signal. The second multiplexing apparatus multiplexes the third specific dummy optical signal and the fourth specific dummy optical signal to obtain a second multiplexing wave. The third multiplexing apparatus multiplexes the first multiplexing wave and the second multiplexing wave to obtain a third multiplexing wave.

Based on the foregoing solution, the multiplexing apparatus may be a wavelength division multiplexing device. In addition, the multiplexing apparatus includes but is not limited to a coupler or a polarization beam splitter. It may be understood that, when the coupler or the polarization beam splitter performs wavelength division multiplexing, the dummy optical signals on different bands may be multiplexed. If the bandpass filter is disposed before the multiplexing apparatus, the multiplexing apparatus may multiplex dummy optical signals selected by the bandpass filter on various bands. The band range of the dummy optical signals after the multiplexing includes a sum of the bands of the various dummy optical signals before the multiplexing.

Optionally, the comb optical bandpass filter may be an etalon or a gain flattening filter. The etalon may be selected according to an actual requirement. For example, a 50 GHz/100 GHz spaced etalon is used, or an etalon with 25 GHz spacing or other spacing is used.

Optionally, to implement flatness of the dummy optical signal, the apparatus for generating a dummy optical signal further includes a circulator. The multi-longitudinal mode laser, the circulator, and the comb optical bandpass filter are connected in sequence. An optical path in the apparatus is as follows: The light source signal provided by the multi-longitudinal mode laser is input through a first port of the circulator, and then is output to the comb optical bandpass filter through a second port of the circulator. The light source signal provided by the multi-longitudinal mode laser is output to a third port of the circulator through a first output port of the comb optical bandpass filter, and is further output to the comb optical bandpass filter through the second port of the circulator. When the dummy optical signal output by the comb optical bandpass filter meets a first preset condition, the dummy optical signal is output through a second output port of the comb optical bandpass filter. In other words, the light source signal provided by the multi-longitudinal mode laser is input through the first port of the circulator and is output from the second port, returns to the third port of the circulator through the comb optical bandpass filter, and is output from the first port to enter the multi-longitudinal mode laser, to form a resonant cavity. Longitudinal mode positions of the multi-longitudinal mode laser are controlled by using a thermoelectric cooler (TEC), to implement gain equalization between longitudinal modes, thereby effectively improving flatness between longitudinal modes in output.

Optionally, the apparatus for generating a dummy optical signal may further include a coupler. A structure is that the multi-longitudinal mode laser, the circulator, the comb optical bandpass filter, and the coupler are connected in sequence. A light source signal provided by the multi-longitudinal mode laser is input through the first port of the circulator, and then is output to the comb optical bandpass filter through the second port of the circulator. The light source signal provided by the multi-longitudinal mode laser is output to the coupler through the comb optical bandpass filter, is output to the third port of the circulator through a first output port of the coupler, is further output to the comb optical bandpass filter through the second port of the circulator, and then is output to the coupler through the comb optical bandpass filter. When a dummy optical signal output by the coupler meets a second preset condition, the dummy optical signal is output through a second output port of the coupler. In other words, the light source signal provided by the multi-longitudinal mode laser is input through the first port of the circulator and is output from the second port, returns to the third port of the circulator through the comb optical bandpass filter and the coupler, and is output from the first port to enter the multi-longitudinal mode laser, to form a resonant cavity. Longitudinal mode positions of the multi-longitudinal mode laser are controlled by using a TEC, to implement gain equalization between longitudinal modes, thereby effectively improving flatness between longitudinal modes in output. In the foregoing two apparatuses, the first preset condition may be the same as or different from the second preset condition, provided that the dummy optical signal is amplified to meet an output condition.

According to a third aspect, an embodiment of this application provides a network system. The system includes the apparatus according to the first aspect and/or the apparatus according to the second aspect, and an optical switch device. The optical switch device receives a dummy optical signal provided by the apparatus according to the first aspect and/or the apparatus according to the second aspect, and multiplexes and outputs the dummy optical signal and another optical signal.

DESCRIPTION OF EMBODIMENTS

Embodiments of this application provide an apparatus for generating a dummy optical signal, to reduce costs of generating a dummy optical signal.

In the specification, claims, and accompanying drawings of this application, terms "first", "second", "third", "fourth", and the like (if existent) are intended to distinguish between similar objects but do not necessarily indicate a specific order or sequence. It should be understood that data used in such a way may be interchangeable in appropriate circumstances, so that embodiments described herein can be implemented in an order other than the content illustrated or described herein. In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

Figure 1:
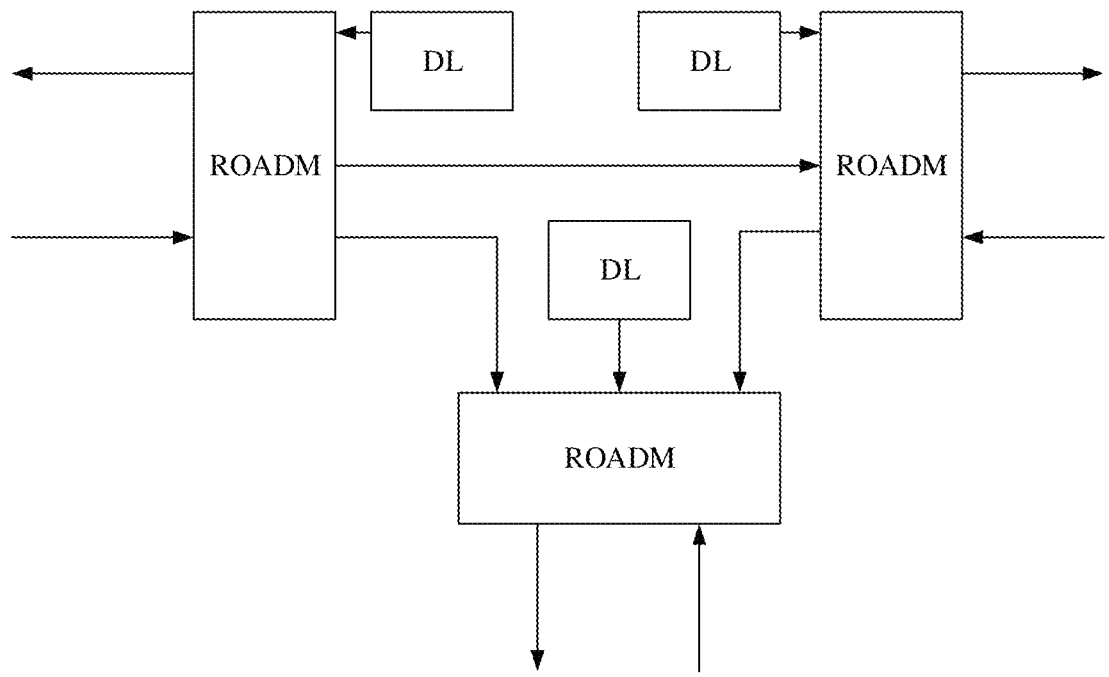
FIG. 1 is a diagram of an example of an application system of an apparatus for generating a dummy optical signal according to an embodiment of this application.

With the development of communications technologies, dozens of or even hundreds of optical channels exist in one optical fiber based on a WDM technology. In addition, with the use of an optical fiber amplifier, high-power multi-wavelength optical signals are coupled into one optical fiber, so that the multi-wavelength optical signals are gathered on a very small interface. In this case, the optical fiber starts to show a nonlinear feature, and becomes a key factor limiting transmission performance. In a WDM system, due to an SRS effect, energy transfer may occur between different wavelengths, causing a decrease in optical power. A dummy light technology is put forward to effectively resolve a power decrease problem caused due to the SRS effect. In an example solution, with reference to FIG. 1, a dummy light (DL in FIG. 1) apparatus (also referred to as an apparatus for generating a dummy optical signal in embodiments of this application) is applied to an optical communications system. The optical communications system includes an optical switch device (a reconfigurable optical add/drop multiplexer (ROADM) shown in FIG. 1). In this case, the dummy optical signal provided by the dummy light apparatus may be input to the optical switch device, and then the optical switch device multiplexes and outputs the dummy optical signal and another optical signal. However, the dummy light technology requires that all wavelengths are enabled at an initial stage. It indicates that a large quantity of OTUs are configured at the initial stage, thereby causing relatively high costs.

Figure 2:
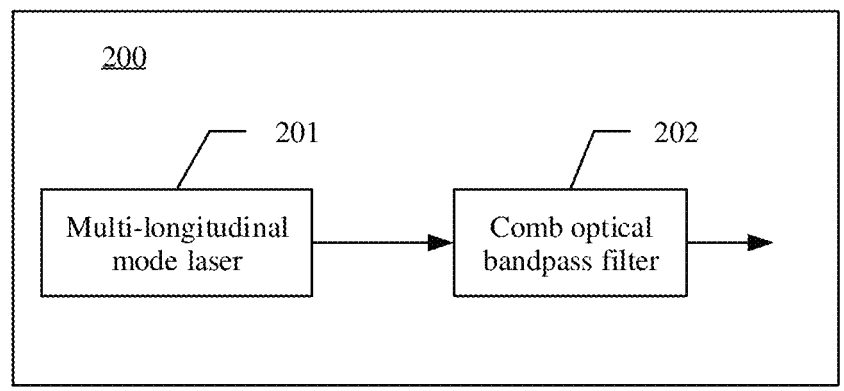
FIG. 2 is a schematic diagram of a structure of an apparatus for generating a dummy optical signal according to an embodiment of this application.

To resolve this problem, an embodiment of this application provides an apparatus 200 for generating a dummy optical signal. As shown in FIG. 2, the apparatus 200 for generating a dummy optical signal includes a multi-longitudinal mode laser 201 and a comb optical bandpass filter 202. The multi-longitudinal mode laser 201 is connected to the comb optical bandpass filter 202. The multi-longitudinal mode laser 201 is configured to provide a light source signal. The light source signal provided by the multi-longitudinal mode laser 201 is output as a dummy optical signal after processing performed by the comb optical bandpass filter 202. The dummy optical signal is an optical signal that does not include service information.

In a wavelength division multiplexing scenario, the dummy optical signal may be an equally spaced multi-wavelength dummy optical signal.

Figure 3:
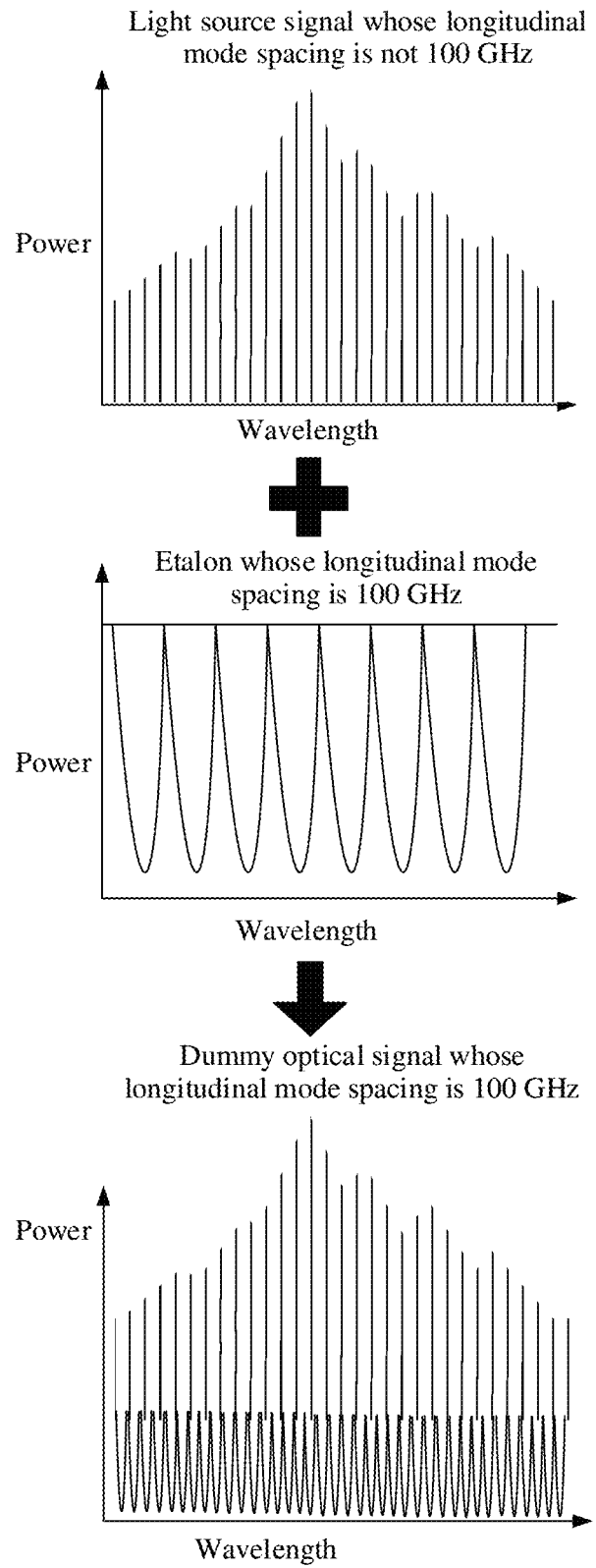
FIG. 3 is a schematic diagram of generating an equally spaced dummy optical signal based on an etalon according to an embodiment of this application.

In this embodiment, the comb optical bandpass filter may be an etalon or a gain flattening filter. The etalon may be selected according to an actual requirement. For example, an etalon with 50 GHz/100 GHz frequency spacing is used, or an etalon with 25 GHz spacing or other spacing is used. The multi-longitudinal mode laser may be an FP laser or another laser, provided that the multi-longitudinal mode laser can output a multi-longitudinal mode light source signal. In an example solution, a process of generating longitudinal mode spacing of the dummy optical signal may be shown in FIG. 3. Frequency spacing (also referred to as longitudinal mode spacing) of the light source signal generated by the multi-longitudinal mode laser is not 100 GHz. The comb optical bandpass filter is a 100 GHz etalon. Finally, frequency spacing of the dummy optical signal filtered and output by the comb optical bandpass filter is 100 GHz.

Figure 4:
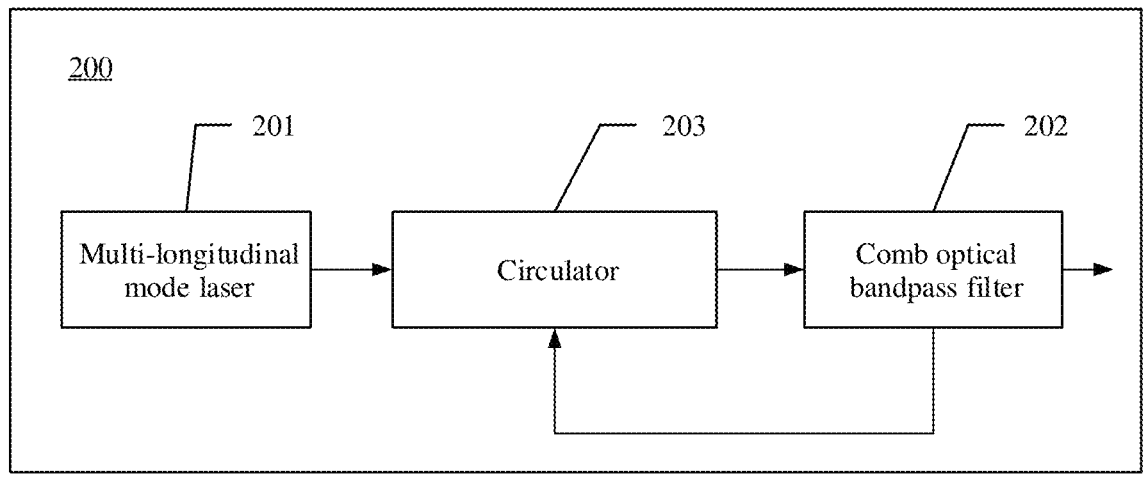
FIG. 4 is a schematic diagram of another structure of an apparatus for generating a dummy optical signal according to an embodiment of this application.

To implement flatness of the dummy optical signal, the apparatus 200 for generating a dummy optical signal further includes a circulator 203. After the circulator 203 is added, a structure of the apparatus 200 is shown in FIG. 4. The multi-longitudinal mode laser 201, the circulator 203, and the comb optical bandpass filter 202 are connected in sequence. In this structure, an optical path in the apparatus is as follows: The light source signal provided by the multi-longitudinal mode laser 201 is input through a first port of the circulator 203, and then is output to the comb optical bandpass filter 202 through a second port of the circulator 203. The light source signal provided by the multi-longitudinal mode laser 201 is output to a third port of the circulator 203 through a first output port of the comb optical bandpass filter 202, and is further output to the comb optical bandpass filter 202 through the second port of the circulator 203. When the dummy optical signal output by the comb optical bandpass filter 202 meets a first preset condition, the dummy optical signal is output through a second output port of the comb optical bandpass filter 202. In other words, the light source signal provided by the multi-longitudinal mode laser 201 is input through the first port of the circulator 203 and is output from the second port, returns to the third port of the circulator through the comb optical bandpass filter, and is output from the first port to enter the multi-longitudinal mode laser, to form a resonant cavity. Longitudinal mode positions of the multi-longitudinal mode laser are controlled by using a thermoelectric cooler (TEC), to implement gain equalization between longitudinal modes, thereby effectively improving flatness between longitudinal modes in output.

Figure 5:
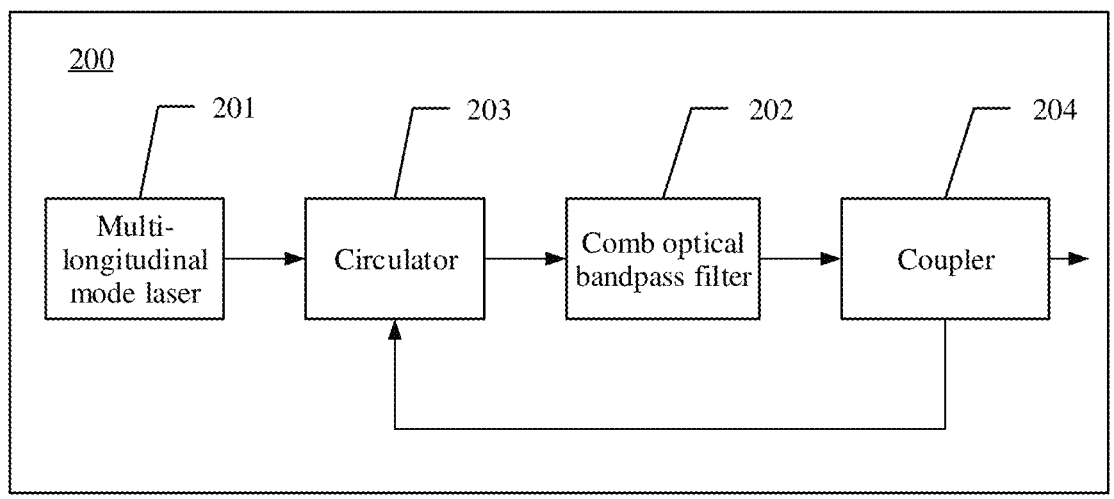
FIG. 5 is a schematic diagram of another structure of an apparatus for generating a dummy optical signal according to an embodiment of this application.

Based on a structure in FIG. 4, the apparatus 200 for generating a dummy optical signal may further include a coupler 204. A structure of the apparatus 200 is shown in FIG. 5. The multi-longitudinal mode laser 201, the circulator 203, the comb optical bandpass filter 202, and the coupler 204 are connected in sequence. A light source signal provided by the multi-longitudinal mode laser 201 is input through the first port of the circulator 203, and then is output to the comb optical bandpass filter 202 through the second port of the circulator 203. The light source signal provided by the multi-longitudinal mode laser 201 is output to the coupler 204 through the comb optical bandpass filter 202, is output to the third port of the circulator 203 through a first output port of the coupler 204, is further output to the comb optical bandpass filter 202 through the second port of the circulator 203, and then is output to the coupler 204 through the comb optical bandpass filter 202. When a dummy optical signal output by the coupler 204 meets a second preset condition, the dummy optical signal is output through a second output port of the coupler 204. In other words, the light source signal provided by the multi-longitudinal mode laser 201 is input through the first port of the circulator 203 and is output from the second port, returns to the third port of the circulator 203 through the comb optical bandpass filter 202 and the coupler 204, and is output from the first port to enter the multi-longitudinal mode laser 201, to form a resonant cavity. Longitudinal mode positions of the multi-longitudinal mode laser 201 are controlled by using a TEC, to implement gain equalization between longitudinal modes, thereby effectively improving flatness between longitudinal modes in output. In the foregoing two apparatuses, the first preset condition may be the same as or different from the second preset condition, provided that the dummy optical signal is amplified to meet an output condition (for example, the dummy optical signal is amplified to enter a power state the same as that of a service signal).

Figure 6:
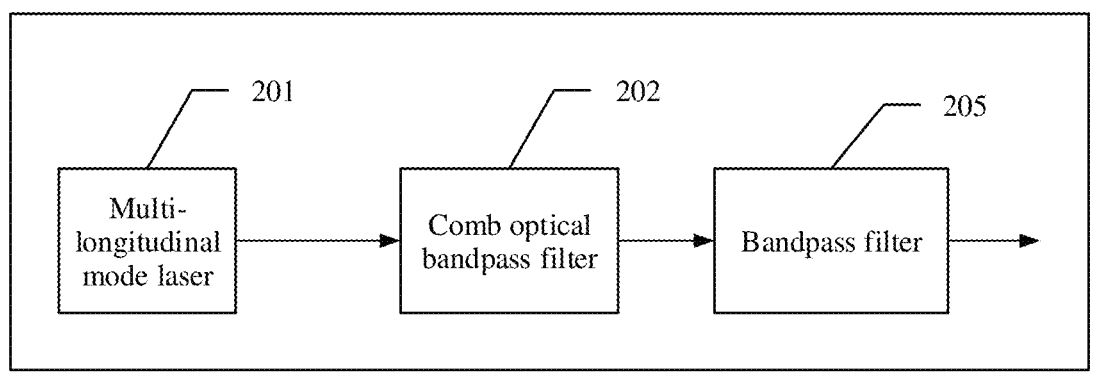
FIG. 6 is a schematic diagram of another structure of an apparatus for generating a dummy optical signal according to an embodiment of this application.

Based on the structure shown in FIG. 2, FIG. 4, or FIG. 5, the apparatus 200 for generating a dummy optical signal may further include a bandpass filter 205. The bandpass filter 205 is configured to: receive the dummy optical signal, and obtain a dummy optical signal on a specific band from the dummy optical signal. Flatness of the specific band (that is, a difference between a maximum power value and a minimum power value in the band) is less than or equal to a preset threshold X, or a peak power of the specific band is greater than or equal to a preset threshold Y. In this embodiment, the dummy optical signal on the specific band may be determined based on the flatness X. For example, the flatness of the dummy optical signal is set to be less than or equal to ±1 dB. In addition, the preset threshold Y of the peak power may be further set, and a corresponding band may be selected based on the preset threshold. It may be understood that selection of the band may be continuous selection or may be spaced selection, provided that a condition is met. To implement this function, the bandpass filter 205 may be located behind the comb optical bandpass filter 202 shown in FIG. 4. Alternatively, the bandpass filter 205 may be located behind the coupler 204 shown in FIG. 5. This is not specifically limited herein. In an example solution shown in FIG. 6, the bandpass filter 205 is located behind the comb optical bandpass filter 202.

To implement the dummy optical signal with a multi-wavelength range, the apparatuses for generating dummy optical signals described in FIG. 2 to FIG. 6 may be superposed (that is, dummy optical signals generated by the plurality of dummy light apparatuses are multiplexed) to generate a cascading system 300. For details, refer to FIG. 7. The cascading system 300 includes the plurality of apparatuses 200 for generating dummy optical signals and at least one multiplexing apparatus 301. The apparatus 200 for generating a dummy optical signal includes the multi-longitudinal mode laser 201 and the comb optical bandpass filter 202. The multi-longitudinal mode laser 201 is connected to the comb optical bandpass filter 202. The multi-longitudinal mode laser 201 is configured to provide a light source signal. A light source signal provided by the multi-longitudinal mode laser 201 outputs a dummy optical signal through the comb optical bandpass filter 202. The dummy optical signal is an optical signal that does not include service information. The multiplexing apparatus 301 multiplexes the dummy optical signals generated by the plurality of apparatuses for generating dummy light. In this embodiment, the multiplexing apparatus 301 may be a wavelength division multiplexing device. For example, the multiplexing apparatus includes but is not limited to a coupler or a polarization beam splitter.

To implement a better multiplexing manner, each apparatus 200 for generating a dummy optical signal (dummy light apparatus) in the cascading system 300 may further include a bandpass filter. The bandpass filter is configured to: receive the dummy optical signal, and obtain a dummy optical signal on a specific band from the dummy optical signal. A peak power corresponding to the dummy optical signal on the specific band is greater than or equal to a preset threshold. To implement this function, the bandpass filter may be located behind the comb optical bandpass filter. Alternatively, the bandpass filter may be located behind the coupler.

Figure 8:
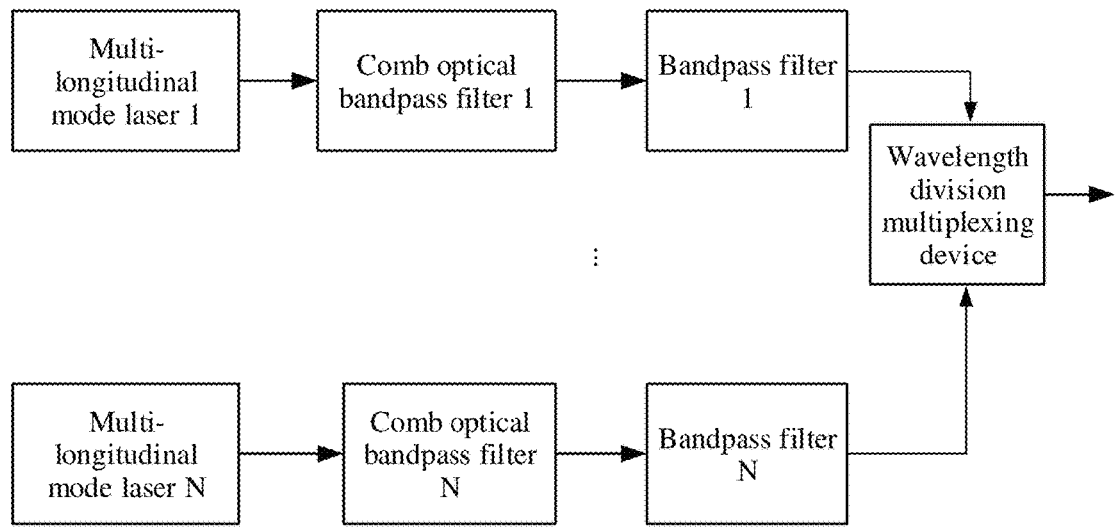
FIG. 8 is a schematic diagram of multiplexing a dummy optical signal by a cascading system according to an embodiment of this application.

When the cascading system 300 multiplexes the plurality of apparatuses 200 for generating dummy optical signals, there may be the following several possible implementations:

In a possible implementation, the plurality of apparatuses 200 for generating dummy optical signals perform one level of multiplexing. The cascading system includes a first apparatus for generating a dummy optical signal and a second apparatus for generating a dummy optical signal. The first apparatus for generating a dummy optical signal includes a first bandpass filter. The second apparatus for generating a dummy optical signal includes a second bandpass filter. An operation that the cascading system multiplexes the dummy optical signals is as follows: The first bandpass filter obtains a first specific dummy optical signal in a first dummy optical signal output by the first apparatus for generating a dummy optical signal. The second bandpass filter obtains a second specific dummy optical signal in a second dummy optical signal output by the second apparatus for generating a dummy optical signal. The multiplexing apparatus multiplexes the first specific dummy optical signal and the second specific dummy optical signal by using a wavelength division multiplexing device. An example solution is shown in FIG. 8. The cascading system 300 includes N dummy light apparatuses each including a bandpass filter. For example, in the N dummy light apparatuses, the first dummy light apparatus includes a multi-longitudinal mode laser 1, a comb optical bandpass filter 1, and a bandpass filter 1, and an $N^{th}$ dummy light apparatus includes a multi-longitudinal mode laser N, a comb optical bandpass filter N, and a bandpass filter N. Then the bandpass filter separately obtains dummy optical signals on a band 1 to a band N. For example, the bandpass filter 1 obtains a dummy optical signal on the band 1, and the bandpass filter N obtains a dummy optical signal on the band N. Then, the wavelength division multiplexing device multiplexes the dummy optical signals on the band 1 to the band N to output a multiplexing wave.

Figure 9:
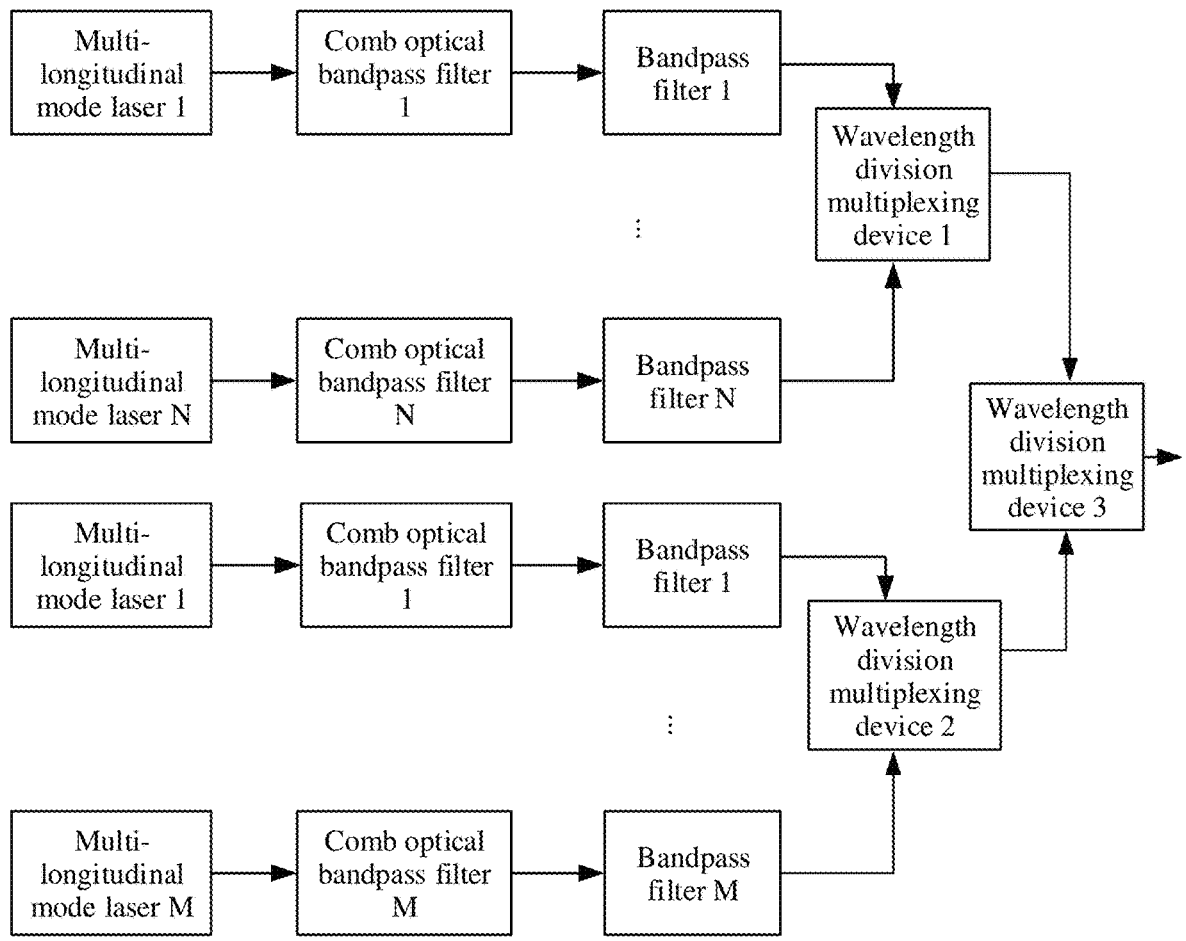
FIG. 9 is another schematic diagram of multiplexing a dummy optical signal by a cascading system according to an embodiment of this application.

In another possible implementation, the plurality of apparatuses for generating dummy optical signals perform a plurality of levels of multiplexing. The cascading system includes a first apparatus for generating a dummy optical signal, a second apparatus for generating a dummy optical signal, a third apparatus for generating a dummy optical signal, a fourth apparatus for generating a dummy optical signal, a first multiplexing apparatus, a second multiplexing apparatus, and a third multiplexing apparatus. The first apparatus for generating a dummy optical signal includes a first bandpass filter. The second apparatus for generating a dummy optical signal includes a second bandpass filter. The third apparatus for generating a dummy optical signal includes a third bandpass filter. The fourth apparatus for generating a dummy optical signal includes a fourth bandpass filter. An operation that the cascading system multiplexes the dummy optical signals is as follows: The first bandpass filter obtains a first specific dummy optical signal in a first dummy optical signal output by the first apparatus for generating a dummy optical signal. The second bandpass filter obtains a second specific dummy optical signal in a second dummy optical signal output by the second apparatus for generating a dummy optical signal. The first multiplexing apparatus multiplexes the first specific dummy optical signal and the second specific dummy optical signal to obtain a first multiplexing wave. The third bandpass filter obtains a third specific dummy optical signal in a third dummy optical signal output by the third apparatus for generating a dummy optical signal. The fourth bandpass filter obtains a fourth specific dummy optical signal in a fourth dummy optical signal output by the fourth apparatus for generating a dummy optical signal. The second multiplexing apparatus multiplexes the third specific dummy optical signal and the fourth specific dummy optical signal to obtain a second multiplexing wave. The third multiplexing apparatus multiplexes the first multiplexing wave and the second multiplexing wave to obtain a third multiplexing wave. An example solution is shown in FIG. 9. The cascading system 300 includes N+M dummy light apparatuses each including a bandpass filter. For example, in the N dummy light apparatuses, the first dummy light apparatus includes a multi-longitudinal mode laser 1, a comb optical bandpass filter 1, and a bandpass filter 1, and an $N^{th}$ dummy light apparatus includes a multi-longitudinal mode laser N, a comb optical bandpass filter N, and a bandpass filter N. Then the bandpass filter separately obtains dummy optical signals on a band 1 to a band N. For example, the bandpass filter 1 obtains a dummy optical signal on the band 1, and the bandpass filter N obtains a dummy optical signal on the band N. Then, a wavelength division multiplexing device 1 multiplexes the dummy optical signals on the band 1 to the band N to output a multiplexing wave. Similarly, in the M dummy light apparatuses, the first dummy light apparatus includes a multi-longitudinal mode laser 1, a comb optical bandpass filter 1, and a bandpass filter 1, and an $M^{th}$ dummy light apparatus includes a multi-longitudinal mode laser M, a comb optical bandpass filter M, and a bandpass filter M. Then the bandpass filter separately obtains dummy optical signals on a band 1 to a band M. For example, the bandpass filter 1 obtains a dummy optical signal on the band 1, and the bandpass filter M obtains a dummy optical signal on the band M. Then, a wavelength division multiplexing device 2 multiplexes the dummy optical signals on the band 1 to the band M to output a multiplexing wave. Finally, the wavelength division multiplexing device 3 further multiplexes the two multiplexing waves.

Figure 10:
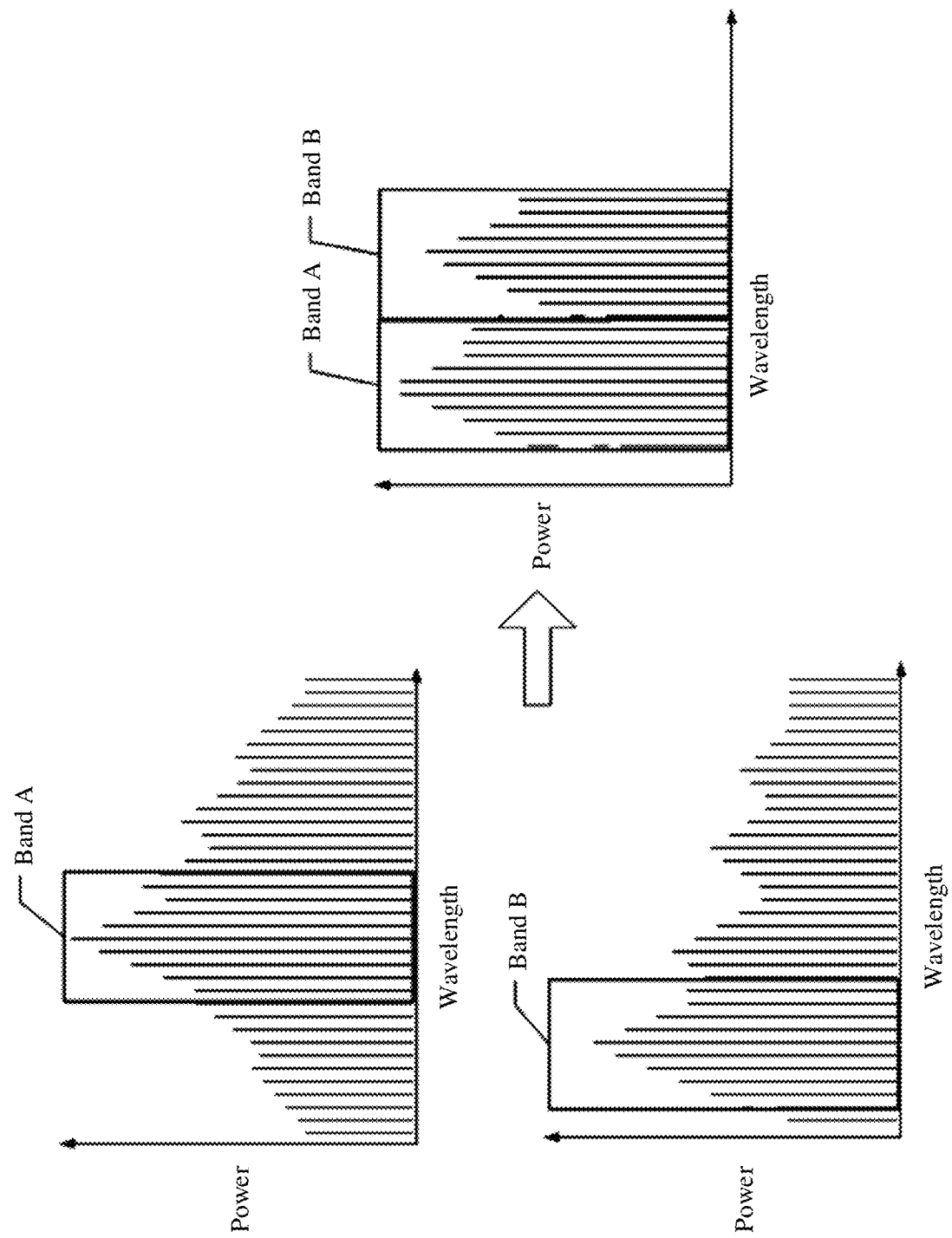
FIG. 10 is a schematic diagram of an effect of multiplexing a dummy optical signal by a cascading system according to an embodiment of this application.

Based on the foregoing solution, the wavelength division multiplexing device includes but is not limited to a coupler or a polarization beam splitter. It may be understood that the coupler or the polarization beam splitter may perform wavelength division multiplexing on dummy optical signals on various bands selected by the plurality of bandpass filters. In an example, the bandpass filter may select a band based on the peak power corresponding to the dummy optical signal, and may select a band whose peak power is greater than or equal to a preset threshold. For example, the band whose peak power is greater than or equal to 50 dB is selected. Under this standard, the band 1 is selected for the dummy optical signal output by the first dummy light apparatus, the band 2 is selected for the dummy optical signal output by the second dummy light apparatus, and the wavelength division multiplexing device multiplexes the dummy optical signals on the band 1 and the band 2. In another example, the bandpass filter may select a band for the dummy optical signal based on a preset band. For example, a band A is selected for the dummy optical signal output by the first dummy light apparatus, a band B is selected for the dummy optical signal output by the second dummy light apparatus, and the wavelength division multiplexing device performs wavelength division multiplexing on the dummy optical signals on the band A and the band B. In an example solution, a power spectrum of the dummy optical signal generated by the wavelength division multiplexing device is shown in FIG. 10. The band A and the band B are selected for the two dummy optical signals. Then, the dummy optical signals on the band A and the band B are multiplexed. In this case, the dummy optical signal output as a whole has better flatness than the dummy optical signal for which the band is not selected. The band range of the dummy optical signals after the multiplexing includes a sum of bands of the various dummy optical signals before the multiplexing, for example, the band A and the band B. The band range of the dummy optical signals after the multiplexing can meet a band requirement of a WDM system for the dummy optical signals.

Nonlinear costs of the WDM system are caused by a cross phase modulation (XPM) effect introduced due to intensity fluctuation of a compensation wave. This effect is directly related to a RIN indicator of the dummy light apparatus. A smaller RIN indicates lower nonlinear costs. The relative intensity noise (RIN) is a ratio between an average output power of the laser and a noise at a specific frequency.

Figure 7:
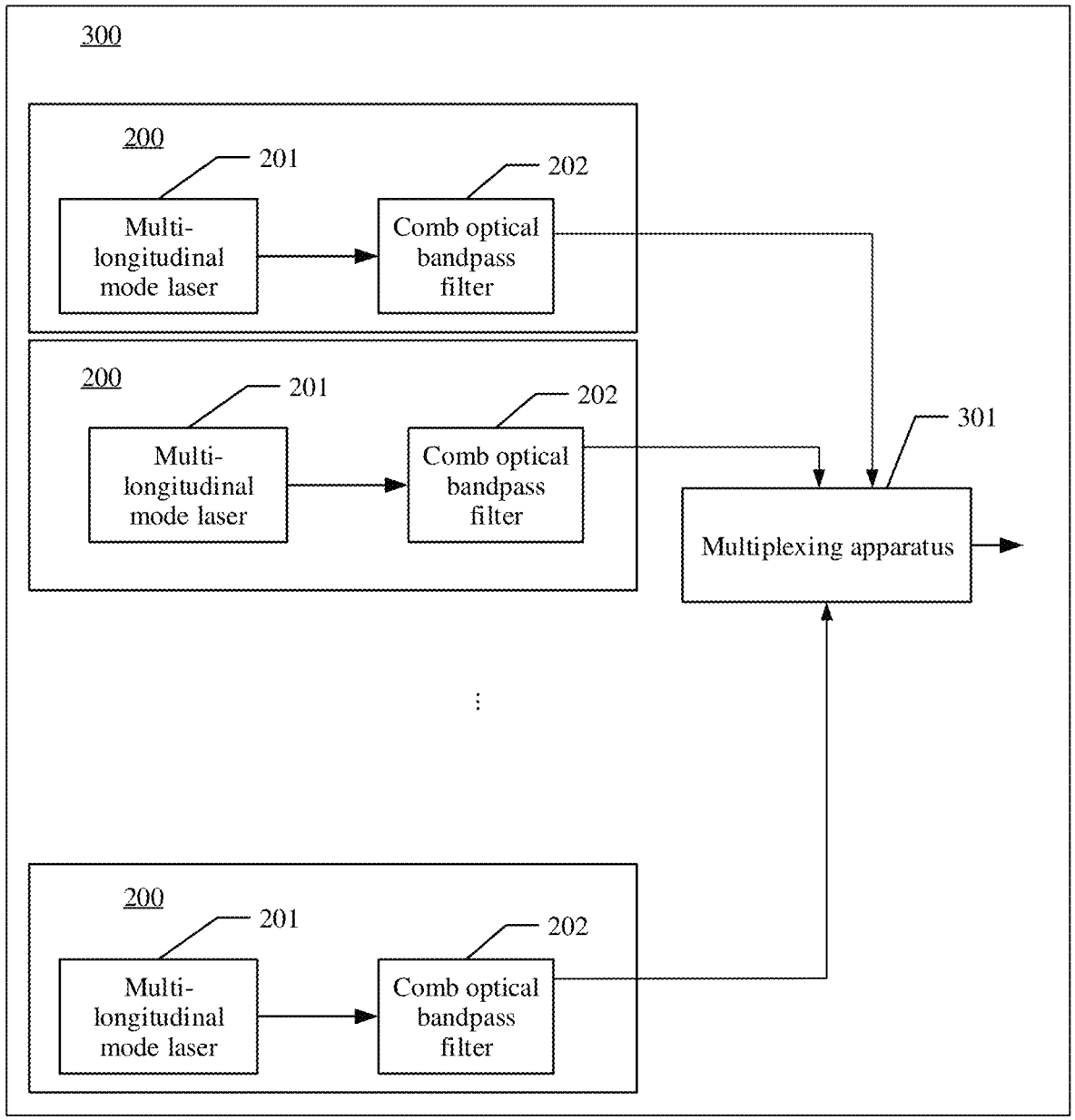
FIG. 7 is a schematic diagram of a structure of a cascading system for generating a dummy optical signal according to an embodiment of this application.

Therefore, there are two manners for optimizing the RIN:

In a possible implementation, the plurality of dummy light apparatuses may be cascaded to form a cascading system shown in FIG. 7.

Figure 11:
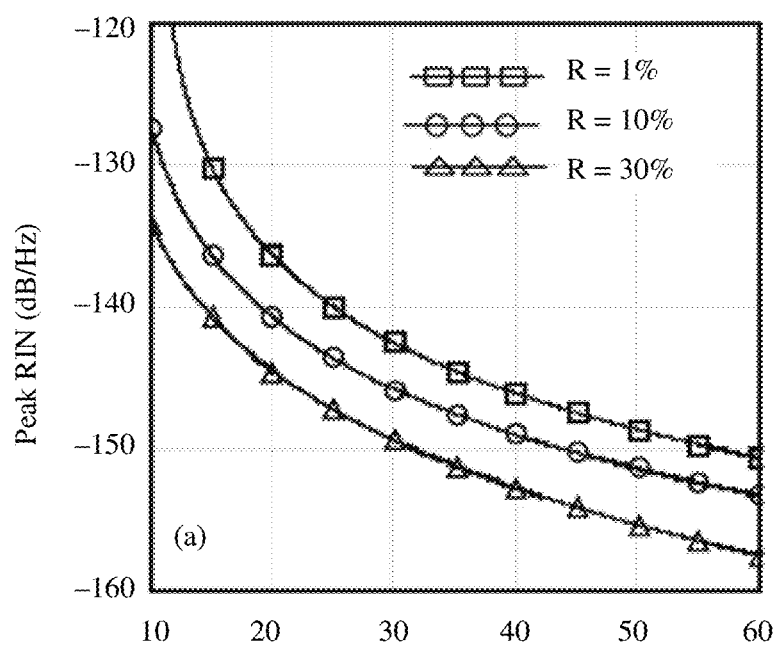
FIG. 11 is a schematic diagram of a relationship between a reflectivity of an out-light end face of a laser and a RIN according to an embodiment of this application.

In another possible implementation, the laser may be optimized. In other words, reflectivity of an out-light end face of the laser may be designed based on a threshold of the RIN. When other conditions remain unchanged, the reflectivity of the out-light end face of the multi-longitudinal mode laser may be improved to effectively reduce the RIN. It may be understood that the out-light end face of the multi-longitudinal mode laser is an emergent end face of the multi-longitudinal mode laser, and the reflectivity of the out-light end face affects an output feature of the laser. A relationship between the reflectivity of the out-light end face and the RIN may be shown in FIG. 11. A horizontal coordinate is used to indicate one end face of the laser. Herein, R is used to indicate the other end face of the laser. A vertical coordinate is used to indicate a RIN value. It may be learned from FIG. 11 that, when other conditions remain unchanged, higher reflectivity of the out-light end face indicates a smaller RIN value.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An apparatus, comprising:
a first dummy optical signal generation apparatus comprising a first multi-longitudinal mode laser configured to provide a first light source signal and a first comb optical bandpass filter, wherein the first light source signal provided by the first multi-longitudinal mode laser is output as a first dummy optical signal by way of processing performed by the first comb optical bandpass filter;
a second dummy optical signal generation apparatus comprising a second multi-longitudinal mode laser configured to provide a second light source signal and a second comb optical bandpass filter, wherein the second light source signal provided by the second multi-longitudinal mode laser is output as a second dummy optical signal by way of processing performed by the second comb optical bandpass filter;
a third dummy optical signal generation apparatus comprising a third multi-longitudinal mode laser configured to provide a third light source signal and a third comb optical bandpass filter, wherein the third light source signal provided by the third multi-longitudinal mode laser is output as a third dummy optical signal by way of processing performed by the third comb optical bandpass filter;
a fourth dummy optical signal generation apparatus comprising a fourth multi-longitudinal mode laser configured to provide a fourth light source signal and a fourth comb optical bandpass filter, wherein the fourth light source signal provided by the fourth multi-longitudinal mode laser is output as a fourth dummy optical signal by way of processing performed by the fourth comb optical bandpass filter;
a first multiplexing apparatus that multiplexes the first dummy optical signal and the second dummy optical signal to obtain a first multiplexed output;
a second multiplexing apparatus that multiplexes the third dummy optical signal and the fourth dummy optical signal to obtain a second multiplexed output; and
a third multiplexing apparatus that multiplexes the first multiplexed output and the second multiplexed output to obtain a third multiplexed output,
wherein the first, second, third and fourth dummy optical signals are each optical signals that do not comprise service information.

2. The apparatus according to claim 1, wherein at least one of the first, second, third or fourth dummy optical signal comprises multi-wavelength signals with preset wavelength spacing.

3. The apparatus according to claim 1, wherein one or more of the first, second, third or fourth dummy optical signal generation apparatus further comprises:
a circulator,
wherein
the multi-longitudinal mode laser, the circulator, and the comb optical bandpass filter included in the one or more of the first, second, third or fourth dummy optical signal generation apparatus having the circulator are connected in sequence, and
in the one or more of the first, second, third or fourth dummy optical signal generation apparatus having the circulator:
the light source signal provided by the multi-longitudinal mode laser is input through a first port of the circulator and output to the comb optical bandpass filter through a second port of the circulator,
the light source signal provided by the multi-longitudinal mode laser is output to a third port of the circulator through a first output port of the comb optical bandpass filter and output to the comb optical bandpass filter through the second port of the circulator, and
in response to the dummy optical signal output by the comb optical bandpass filter through the first output port of the comb bandpass filter meeting a first preset condition, the dummy optical signal is output through a second output port of the comb optical bandpass filter.

4. The apparatus according to claim 1, wherein one or more of the first, second, third or fourth dummy optical signal generation apparatus further comprises:
a circulator; and
a coupler,
wherein
the multi-longitudinal mode laser, the circulator, the comb optical bandpass filter, and the coupler included in the one or more of the first, second, third or fourth dummy optical signal generation apparatus having the circulator and the coupler are connected in sequence, and
in the one or more of the first, second, third or fourth dummy optical signal generation apparatus having the circulator and the coupler:
the light source signal provided by the multi-longitudinal mode laser is input through a first port of the circulator and output to the comb optical bandpass filter through a second port of the circulator to the coupler through the comb optical bandpass filter such that the coupler receives the dummy optical signal, and the dummy optical signal is output to a third port of the circulator through a first output port of the coupler, and
in response to the dummy optical signal output by the coupler through the first output port of the coupler meeting a second preset condition, the dummy optical signal is output through a second output port of the coupler.

5. The apparatus according to claim 1, wherein
at least one of the first, second, third or fourth dummy optical signal is a multi-wavelength signal,
one or more of the first, second, third or fourth dummy optical signal generation apparatus further comprises:
a bandpass filter downstream of the comb optical bandpass filter configured to receive the dummy optical signal output by a corresponding comb optical bandpass filter of the one or more of the first, second, third or fourth dummy optical signal generation apparatus having the bandpass filter and obtain a dummy optical signal on a specific band from the dummy optical signal, and
a peak power corresponding to the dummy optical signal on the specific band is greater than or equal to a preset threshold.

6. The apparatus according to claim 1, wherein a reflectivity of an out-light end face of at least one of the first, second, third or fourth multi-longitudinal mode laser is determined based on a relative intensity noise (RIN) of the apparatus.

7. A cascading system, comprising:
a plurality of dummy optical signal generation apparatuses; and
a plurality of multiplexing apparatuses,
wherein
each dummy optical signal generation apparatus comprises:
a multi-longitudinal mode laser configured to provide a light source signal;
a comb optical bandpass filter; and
a bandpass filter downstream of the comb optical bandpass filter,
the light source signal provided by the multi-longitudinal mode laser of each dummy optical signal generation apparatus outputs a dummy optical signal through the comb optical bandpass filter of a same dummy optical signal generation apparatus, and the dummy optical signal is an optical signal that does not comprise service information,
the bandpass filter is configured to receive the dummy optical signal output by the comb optical bandpass apparatus of the same dummy optical signal generation apparatus and obtain a dummy optical signal on a specific band from the dummy optical signal output by the multi-longitudinal mode laser through the comb optical bandpass filter of the same dummy optical signal generation apparatus,
the plurality of multiplexing apparatuses comprises a first multiplexing apparatus, a second multiplexing apparatus, and a third multiplexing apparatus,
the first multiplexing apparatus multiplexes the dummy optical signal on the specific band obtained by the bandpass filter of at least two dummy optical signal generation apparatuses of the plurality of dummy optical signal generation apparatuses to obtain a first multiplexed output,
the second multiplexing apparatus multiplexes the dummy optical signal on the specific band obtained by the bandpass filter of at least two other dummy optical signal generation apparatuses of the plurality of dummy optical signal generation apparatuses different from dummy optical signal generation apparatuses of the plurality of dummy optical signal generation apparatuses having an output communicatively coupled with the first multiplexing apparatus to obtain a second multiplexed output, and
the third multiplexing apparatus multiplexes the first multiplexed output and the second multiplexed output to obtain a third multiplexed output.

8. The cascading system according to claim 7, wherein the dummy optical signals comprise multi-wavelength signals with preset frequency spacing.

9. The cascading system according to claim 7, wherein
a peak power corresponding to the dummy optical signal on the specific band is greater than or equal to a preset threshold.

10. The cascading system according to claim 9, wherein
the plurality of dummy optical signal generation apparatuses comprises a first dummy optical signal generation apparatus, and a second dummy optical signal generation apparatus,
the bandpass filter included in the first dummy optical signal generation apparatus is a first bandpass filter, and the bandpass filter included in the second dummy optical signal generation apparatus is a second bandpass filter,
the first bandpass filter is configured to obtain a first specific dummy optical signal in a first dummy optical signal received from the comb optical bandpass apparatus of the first dummy optical signal generation apparatus,
the second bandpass filter is configured to obtain a second specific dummy optical signal in a second dummy optical signal received from the comb optical bandpass apparatus of the second dummy optical signal generation apparatus, and
the first multiplexing apparatus performs wavelength division multiplexing on the first specific dummy optical signal and the second specific dummy optical signal.

11. The cascading system according to claim 9, wherein
the plurality of dummy optical signal generation apparatuses comprises a first dummy optical signal generation apparatus, a second dummy optical signal generation apparatus, a third dummy optical signal generation apparatus, and a fourth dummy optical signal generation apparatus,
the bandpass filter included in the first dummy optical signal generation apparatus is a first bandpass filter, the bandpass filter included in the second dummy optical signal generation apparatus is a second bandpass filter, the bandpass filter included in the third dummy optical signal generation apparatus is a third bandpass filter, and the bandpass filter included in the fourth dummy optical signal generation apparatus is a fourth bandpass filter,
the first bandpass filter is configured to obtain a first specific dummy optical signal in a first dummy optical signal received from the comb optical bandpass apparatus of the first dummy optical signal generation apparatus,
the second bandpass filter is configured to obtain a second specific dummy optical signal in a second dummy optical signal received from the comb optical bandpass apparatus of the second dummy optical signal generation apparatus,
the first multiplexing apparatus multiplexes the first specific dummy optical signal and the second specific dummy optical signal to obtain the first multiplexed output,
the third bandpass filter is configured to obtain a third specific dummy optical signal in a third dummy optical signal received from the comb optical bandpass apparatus of the third dummy optical signal generation apparatus, the fourth bandpass filter is configured to obtain a fourth specific dummy optical signal in a fourth dummy optical signal received from the comb optical bandpass apparatus of the fourth dummy optical signal generation apparatus, the second multiplexing apparatus multiplexes the third specific dummy optical signal and the fourth specific dummy optical signal to obtain the second multiplexed output, and the first multiplexing apparatus, the second multiplexing apparatus and the third multiplexing apparatus perform wavelength division multiplexing on the specific dummy optical signals received or the multiplexed outputs received.

12. The cascading system according to claim 7, wherein each dummy optical signal generation apparatus further comprises a circulator, the multi-longitudinal mode laser, the circulator, and the comb optical bandpass filter are connected in sequence, the light source signal provided by the multi-longitudinal mode laser is input through a first port of the circulator and output to the comb optical bandpass filter through a second port of the circulator, the light source signal provided by the multi-longitudinal mode laser is output to a third port of the circulator through a first output port of the comb optical bandpass filter and output to the comb optical bandpass filter through the second port of the circulator, and in response to the dummy optical signal output by the comb optical bandpass filter through the first output port of the comb bandpass filter meeting a first preset condition, the dummy optical signal is output through a second output port of the comb optical bandpass filter.

13. The cascading system according to claim 12, wherein each dummy optical signal generation apparatus further comprises a coupler, the multi-longitudinal mode laser, the circulator, the comb optical bandpass filter, and the coupler are connected in sequence, the light source signal provided by the multi-longitudinal mode laser is input through the first port of the circulator and output to the comb optical bandpass filter through the second port of the circulator, the light source signal provided by the multi-longitudinal mode laser is output to the coupler through the comb optical bandpass filter, is output to the third port of the circulator through a first output port of the coupler, is output to the comb optical bandpass filter through the second port of the circulator, and is output to the coupler through the comb optical bandpass filter, and in response to a dummy optical signal output by the coupler through the first output port of the coupler meeting a second preset condition, the dummy optical signal is output through a second output port of the coupler.

14. A network system, comprising:

a first dummy optical signal generation apparatus comprising a first multi-longitudinal mode laser configured to provide a first light source signal, a first comb optical bandpass filter downstream of the first multi-longitudinal mode laser, and a first bandpass filter downstream of the first comb optical bandpass filter;

a second dummy optical signal generation apparatus comprising a second multi-longitudinal mode laser configured to provide a second light source signal, a second comb optical bandpass filter downstream of the second multi-longitudinal mode laser, and a second bandpass filter downstream of the second comb optical bandpass filter;

a third dummy optical signal generation apparatus comprising a third multi-longitudinal mode laser configured to provide a third light source signal, a third comb optical bandpass filter downstream of the third multi-longitudinal mode laser, and a third bandpass filter downstream of the third comb optical bandpass filter;

a fourth dummy optical signal generation apparatus comprising a fourth multi-longitudinal mode laser configured to provide a fourth light source signal, a fourth comb optical bandpass filter downstream of the fourth multi-longitudinal mode laser, and a fourth bandpass filter downstream of the fourth comb optical bandpass filter;

a first multiplexing apparatus;
a second multiplexing apparatus;
a third multiplexing apparatus; and
an optical switch device, wherein the first bandpass filter is configured to obtain a first specific dummy optical signal in a first dummy optical signal received by way of the first comb optical bandpass filter, the second bandpass filter is configured to obtain a second specific dummy optical signal in a second dummy optical signal received by way of the second comb optical bandpass filter, the first multiplexing apparatus multiplexes the first specific dummy optical signal and the second specific dummy optical signal to obtain a first multiplexed output, the third bandpass filter is configured to obtain a third specific dummy optical signal in a third dummy optical signal received by way of the third comb optical bandpass filter, the fourth bandpass filter is configured to obtain a fourth specific dummy optical signal in a fourth dummy optical signal received by way of the fourth comb optical bandpass filter, the second multiplexing apparatus multiplexes the third specific dummy optical signal and the fourth specific dummy optical signal to obtain a second multiplexed output, and the third multiplexing apparatus multiplexes the first multiplexed output and the second multiplexed output to obtain a third multiplexed output, and outputs the third multiplexed output to the optical switch device.

15. The network system according to claim 14, wherein at least one of the first, second, third or fourth dummy optical signal comprises multi-wavelength signals with preset wavelength spacing.

16. The network system according to claim 14, wherein a peak power corresponding to the at least one of the first, second, third or fourth dummy optical signal is greater than or equal to a preset threshold.

17. The network system according to claim 14, wherein one or more of the first, second, third or fourth dummy optical signal generation apparatus further comprises a circulator, the multi-longitudinal mode laser, the circulator, and the comb optical bandpass filter included in the one or more of the first, second, third or fourth dummy optical signal generation apparatus having the circulator are connected in sequence, and in the one or more of the first, second, third or fourth dummy optical signal generation apparatus having the circulator:

the light source signal provided by the multi-longitudinal mode laser is input through a first port of the circulator and output to the comb optical bandpass filter through a second port of the circulator, the light source signal provided by the multi-longitudinal mode laser is output to a third port of the circulator through a first output port of the comb optical bandpass filter and output to the comb optical bandpass filter through the second port of the circulator, and in response to the dummy optical signal output by the comb optical bandpass filter through the first output port of the comb bandpass filter meeting a first preset condition, the dummy optical signal is output through a second output port of the comb optical bandpass filter.

18. The network system according to claim 14, wherein at least one of the first, second, third or fourth multiplexing apparatus performs wavelength division multiplexing on the first specific dummy optical signal and the second specific dummy optical signal, the third specific dummy optical signal and the fourth specific dummy optical signal, or the first multiplexed output and the second multiplexed output.

19. The network system according to claim 14, wherein one or more of the first, second, third or fourth dummy optical signal generation apparatus further comprises:

a circulator; and
a coupler,
wherein the multi-longitudinal mode laser, the circulator, the comb optical bandpass filter, and the coupler included in the one or more of the first, second, third or fourth dummy optical signal generation apparatus having the circulator and the coupler are connected in sequence, and in the one or more of the first, second, third or fourth dummy optical signal generation apparatus having the circulator and the coupler:

the light source signal provided by the multi-longitudinal mode laser is input through a first port of the circulator and output to the comb optical bandpass filter through a second port of the circulator to the coupler through the comb optical bandpass filter such that the coupler receives the dummy optical signal, and the dummy optical signal is output to a third port of the circulator through a first output port of the coupler, and in response to the dummy optical signal output by the coupler through the first output port of the coupler meeting a second preset condition, the dummy optical signal is output through a second output port of the coupler.

20. The network system according to claim 14, wherein a reflectivity of an out-light end face of at least one of the first, second, third or fourth multi-longitudinal mode laser is determined based on a relative intensity noise (RIN) of the apparatus.

* * * * *